United States Patent
Kim et al.

(10) Patent No.: US 10,820,363 B2
(45) Date of Patent: Oct. 27, 2020

(54) METHOD FOR PERFORMING RRC CONNECTION RE-ESTABLISHMENT PROCEDURE AND DEVICE SUPPORTING THE SAME

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 15/661,356

(22) Filed: Jul. 27, 2017

(65) Prior Publication Data

US 2018/0035484 A1    Feb. 1, 2018

Related U.S. Application Data

(60) Provisional application No. 62/367,652, filed on Jul. 28, 2016.

(51) Int. Cl.
*H04W 76/28* (2018.01)
*H04W 76/19* (2018.01)
*H04W 36/08* (2009.01)
*H04W 76/27* (2018.01)

(52) U.S. Cl.
CPC ............ *H04W 76/19* (2018.02); *H04W 36/08* (2013.01); *H04W 76/27* (2018.02)

(58) Field of Classification Search
CPC . H04W 76/028; H04W 76/046; H04W 36/08; H04W 36/0033; H04W 36/0055; H04W 76/19
See application file for complete search history.

(56) References Cited

U.S. PATENT DOCUMENTS

| | | | | |
|---|---|---|---|---|
| 2014/0295820 A1* | 10/2014 | Kim | ................. | H04W 52/0216 455/418 |
| 2018/0192332 A1* | 7/2018 | Joshi | ................... | H04W 36/305 |
| 2018/0328079 A1* | 11/2018 | Lim | ....................... | H04W 4/80 |

\* cited by examiner

*Primary Examiner* — Anez C Ebrahim
(74) *Attorney, Agent, or Firm* — Lee Hong Degerman Kang Waimey (57) ABSTRACT

Proposes are: a method for performing a radio resource control (RRC) connection re-establishment procedure by a user equipment (UE) in a wireless communication system, and a device supporting the same. The method includes: entering an RRC connected state; receiving an RRC connection re-establishment condition; determining whether the RRC connection re-establishment condition is satisfied based on a measurement result; and performing an RRC connection re-establishment procedure when the RRC connection re-establishment condition is satisfied, wherein the UE is a UE not supporting a handover in the RRC connected state.

2 Claims, 7 Drawing Sheets

METHOD FOR PERFORMING RRC CONNECTION RE-ESTABLISHMENT PROCEDURE AND DEVICE SUPPORTING THE SAME

CROSS-REFERENCE TO RELATED APPLICATIONS

Pursuant to 35 U.S.C. § 119(e), this application claims the benefit of U.S. Provisional Patent Application No. 62/367,652, filed on Jul. 28, 2016, the contents of which are hereby incorporated by reference herein in its entirety.

BACKGROUND OF THE INVENTION

Field of the Invention

The present invention relates to a method for performing an RRC connection procedure by a user equipment (UE) not supporting a handover operation, and a device supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas.

Recently, research has been actively conducted on Internet of Things (IoT), which is communication between devices or between a device and a server without human interaction, that is, human intervention. IoT refers to a concept that a machine, not a user equipment (UE) used by a human, communicates using an existing wireless communication network.

Since IoT has different characteristics from a general UE, a service optimized for IoT communication may be different from a service optimized for human-to-human communication. IoT communication may be distinguished from a current mobile network communication service by a different market scenario, data communication, low cost and effort, a very large number of potential IoT devices, a wide service area, and low traffic per IoT device.

As one of IoT technologies, a narrowband IoT (NB-IoT) technology is emerging. NB-IoT is a low-power wide-area (LPWA) IoT technology using an LTE frequency, which is frequently used for tracking, sensing, and metering that involves the intermittent transmission of low-capacity data. A UE supporting the NB-IoT technology needs to be used for a long time without battery replacement and thus is required to operate with extremely low power.

SUMMARY OF THE INVENTION

A user equipment (UE) used in narrowband Internet of Things (NB-IoT) is required to operate with low power and thus supports only minimum functions for communication with a base station. For example, an NB-IoT UE does not support a handover function in an RRC connected state. Therefore, when the UE connected to a specific cell moves to another cell, the UE may have a radio link failure (RLF) and it may take much time for the UE to recover to the RRC connected state.

According to one embodiment of the present invention, there is provided a method for performing a radio resource control (RRC) connection re-establishment procedure by a UE in a wireless communication system, the method including: entering an RRC connected state; receiving an RRC connection re-establishment condition; determining whether the RRC connection re-establishment condition is satisfied based on a measurement result; and performing an RRC connection re-establishment procedure when the RRC connection re-establishment condition is satisfied, wherein the UE is a UE not supporting a handover in the RRC connected state.

The RRC connection re-establishment condition may include a condition that the measurement result with respect to a serving cell is lower than a preset threshold.

The RRC connection re-establishment condition may include a condition that there is a measurement result with respect to a neighboring cell that is superior to the measurement result with respect to a serving cell.

The performing of the RRC connection re-establishment procedure may include receiving a permission indication with respect to performing an RRC connection re-establishment procedure from a network.

The performing of the RRC connection re-establishment procedure may include: reselecting a neighboring cell that satisfies the RRC connection re-establishment condition; and performing the RRC connection re-establishment procedure with respect to the reselected cell.

When there is a plurality of neighboring cells that satisfy the RRC connection re-establishment condition, the reselecting may include reselecting a neighboring cell having a best measurement result among the plurality of neighboring cells.

The performing of the RRC connection re-establishment procedure may include transmitting an RRC connection re-establishment request message to a network, and the RRC connection re-establishment request message may include a re-establishment cause indicating that the RRC connection re-establishment request message is aimed for mobility of the UE.

Wherein the RRC connection re-establishment request message may comprise resume identity (resume ID) of the UE assigned by the serving cell.

The performing of the RRC connection re-establishment procedure may include: transmitting an RRC connection re-establishment request message to a network; and resuming a radio bearer under a condition of receiving an RRC connection re-establishment message from the network in response to the RRC connection re-establishment request message.

According to another embodiment, there is provided a UE performing an RRC connection re-establishment procedure in a wireless communication system, the UE including: a memory; a transceiver; and a processor to connect the memory and the transceiver, wherein the processor is configured to: enter an RRC connected state; receive an RRC connection re-establishment condition; determine whether the RRC connection re-establishment condition is satisfied based on a measurement result; and perform an RRC connection re-establishment procedure when the RRC connection re-establishment condition is satisfied, and the UE is a UE not supporting a handover in the RRC connected state.

The RRC connection re-establishment condition may include a condition that the measurement result with respect to a serving cell is lower than a preset threshold.

The RRC connection re-establishment condition may include a condition that there is a measurement result with respect to a neighboring cell that is superior to the measurement result with respect to a serving cell.

The processor may be configured to receive a permission indication with respect to performing an RRC connection re-establishment procedure from a network.

The processor may be configured to: reselect a neighboring cell that satisfies the RRC connection re-establishment condition; and perform the RRC connection re-establishment procedure with respect to the reselected cell.

When there is a plurality of neighboring cells that satisfy the RRC connection re-establishment condition, the processor may be configured to reselect a neighboring cell having a best measurement result among the plurality of neighboring cells.

The processor may be configured to transmit an RRC connection re-establishment request message to a network, and the RRC connection re-establishment request message may include a re-establishment cause indicating that the RRC connection re-establishment request message is aimed for mobility of the UE.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A/5G. However, technical features of the present invention are not limited thereto.

Figure 1:
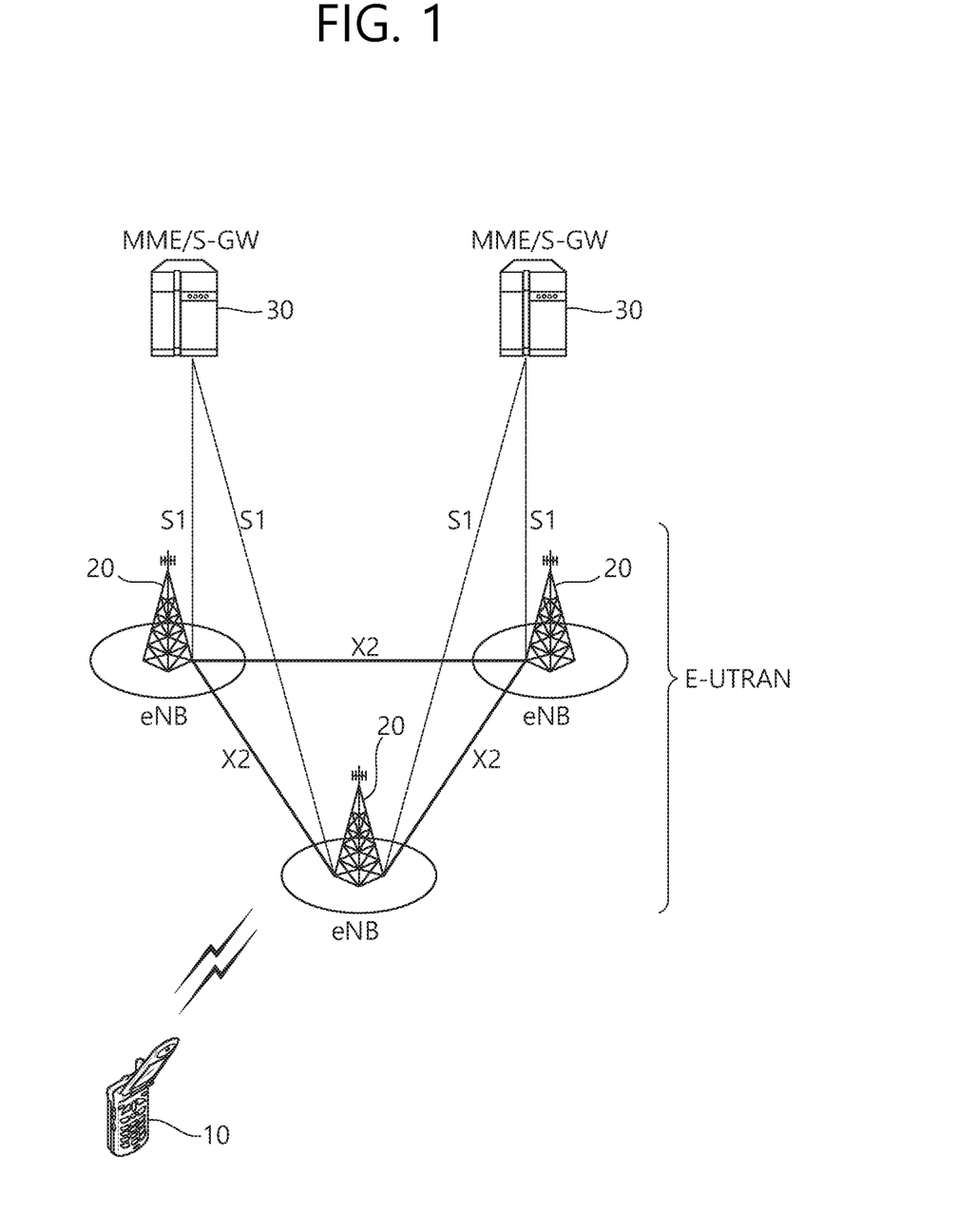
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include one or more evolved node-Bs (eNBs) 20, and a plurality of UEs may be located in one cell. An E-UTRAN system is an evolved system from an existing URAN system, which may be, for example, a 3GPP LTE/LTE-A system. The E-UTRAN includes base stations (eNBs) that provide control-plane and user-plane protocols to a UE, and the base stations (BSs) are connected via an X2 interface. An X2 user-plane interface (X2-U) is defined between BSs. The X2-U provides non-guaranteed delivery of a user-plane packet data unit (PDU). An X2 control-plane interface (X2-CP) is defined between two neighboring BSs. The X2-CP performs the functions of delivering context between the BSs, controlling a user-plane tunnel between a source BS and a target BS, delivering a handover-related message, and uplink load management. A BS is connected to a UE through a wireless interface and is connected to the EPC through an S1 interface. An S1 user-plane interface (S1-U) is defined between a BS and a serving gateway (S-GW). An S1 control-plane interface (S1-MME) is defined between a BS and a mobility management entity (MME). The S1 interface performs an evolved packet system (EPS) bearer service management function, a non-access stratum (NAS) signaling transport function, a network sharing function, and an MME load balancing function. The S1 interface supports many-to-many-relations between the BS and the MME/S-GW.

The eNB 20 provides an end point of a control plane and a user plane to the UE. The eNB 20 generally refers to a fixed station that communicates with the UE 10 and may be referred to as another term, such as a base station (BS), a base transceiver system (BTS), an access point, and the like. One eNB 20 may be deployed per cell. There are one or more cells within the coverage of the eNB 20. A single cell may be configured to have one bandwidth among 1.25, 2.5, 5, 10, and 20 MHz and may provide downlink or uplink transmission services to a plurality of UEs. Here, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/ S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including nonaccess stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
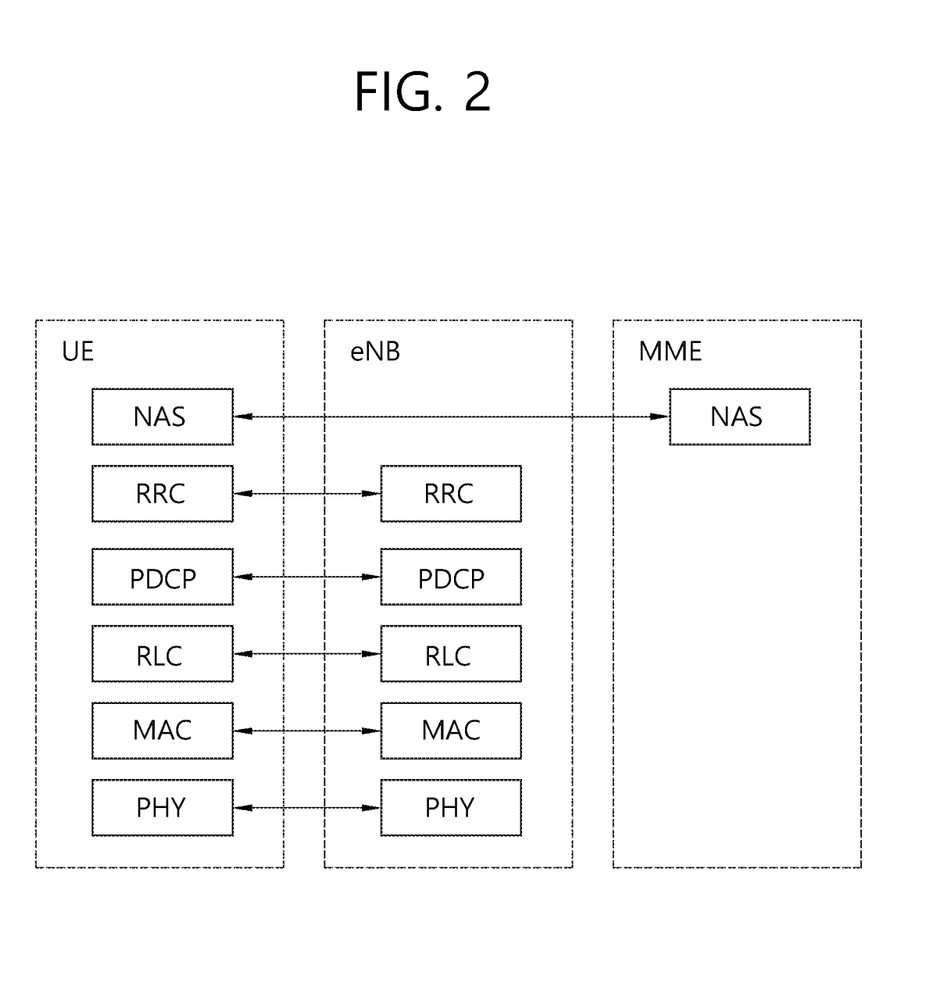
FIG. 2 shows a block diagram of a control plane protocol stack of an LTE system.
Figure 3:
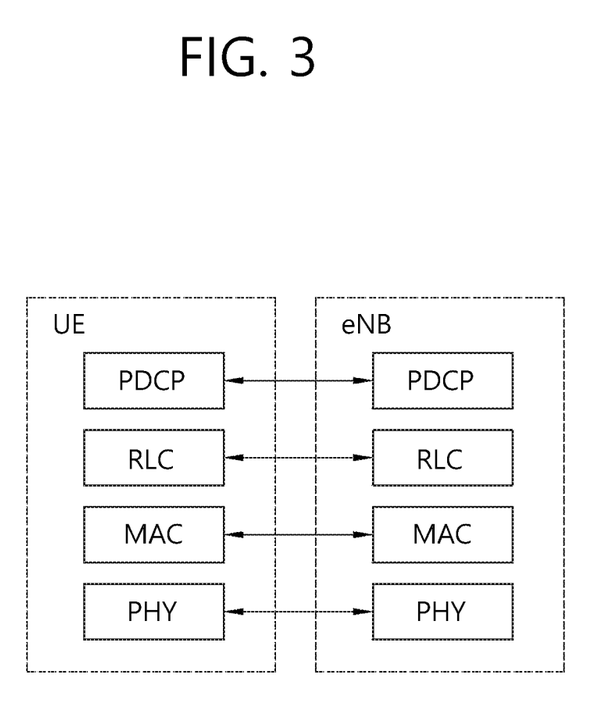
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/ multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a conventional RRC connection re-establishment procedure will be described.

This procedure aims to re-establish an RRC connection, which includes resuming an SRB1 operation, reactivating security, and establishing a PCell.

An RRC_CONNECTED UE with security activated may start the procedure to continue the RRC connection. Connection re-establishment is successful only when the cell is ready, that is, when the cell has a valid UE context. When an E-UTRAN accepts re-establishment, the SRB1 operation is resumed while an operation of another radio bearer is stopped. When AS security is not activated, the UE does not start the procedure but goes directly to RRC_IDLE instead.

Figure 4:
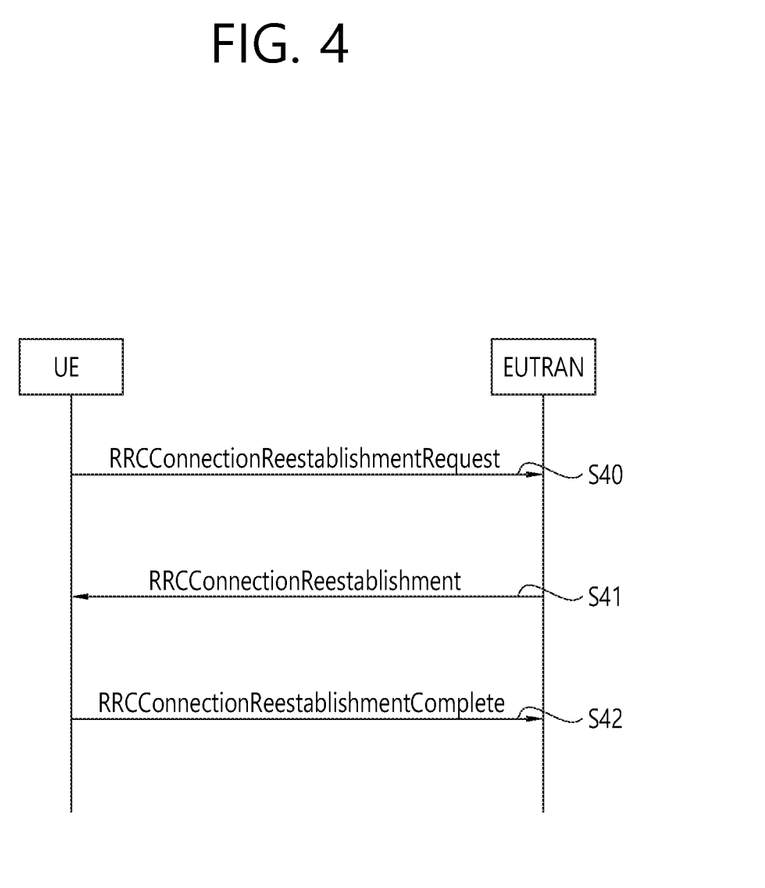
FIG. 4 illustrates an RRC connection re-establishment procedure.

Referring to FIG. 4, at step S40, the UE transmits an RRC connection re-establishment request (RRCConnectionReestablishmentRequest) message to the E-UTRAN. At step S41, the E-UTRAN transmits an RRC connection re-establishment (RRCConnectionReestablishment) message to the UE. At step S42, the UE transmits an RRC connection re-establishment complete (RRCConnectionReestablishmentComplete) message to the E-UTRAN.

Specifically, The UE shall only initiate the procedure when AS security has been activated. The UE initiates the procedure when one of the following conditions is met:

1> upon detecting radio link failure, in accordance with 5.3.11; or

1> upon handover failure, in accordance with 5.3.5.6; or

1> upon mobility from E-UTRA failure, in accordance with 5.4.3.5; or

1> upon integrity check failure indication from lower layers; or upon an RRC connection reconfiguration failure;

Upon initiation of the procedure, the UE shall:

1> stop timer T310, if running;

1> stop timer T312, if running;

1> stop timer T313, if running;

1> stop timer T307, if running;

1> start timer T311;

1> stop timer T370, if running;

1> suspend all RBs except SRB0;

1> reset MAC;

1> release the MCG SCell(s), if configured, in accordance with 5.3.10.3a;

1> apply the default physical channel configuration as specified in 9.2.4;

1> for the MCG, apply the default semi-persistent scheduling configuration as specified in 9.2.3;

1> for the MCG, apply the default MAC main configuration as specified in 9.2.2;

1> release powerPrefIndicationConfig, if configured and stop timer T340, if running;

1> release reportProximityConfig and clear any associated proximity status reporting timer;

1> release obtainLocationConfig, if configured;

1> release idc-Config, if configured;

1> release measSubframePatternPCell, if configured;

1> release the entire SCG configuration, if configured, except for the DRB configuration (as configured by drb-ToAddModListSCG);

1> release naics-Info for the PCell, if configured;

1> if connected as an RN and configured with an RN subframe configuration:

2> release the RN subframe configuration;

1> release the LWA configuration, if configured, as described in 5.6.14.3;

1> perform LWIP release procedure as specified in section 5.6.17.3;

1> perform cell selection in accordance with the cell selection process as specified in TS 36.304 [4];

The UE shall set the contents of RRCConnectionReestablishmentRequest message as follows:

1> set the ue-Identity as follows:

2> set the c-RNTI to the C-RNTI used in the source PCell (handover and mobility from E-UTRA failure) or used in the PCell in which the trigger for the re-establishment occurred (other cases);

2> set the physCellId to the physical cell identity of the source PCell (handover and mobility from E-UTRA failure) or of the PCell in which the trigger for the re-establishment occurred (other cases);

2> set the shortMAC-I to the 16 least significant bits of the MAC-I calculated:

3> over the ASN.1 encoded as per section 8 (i.e., a multiple of 8 bits) VarShortMAC-Input;

3> with the KRRCint key and integrity protection algorithm that was used in the source PCell (handover and mobility from E-UTRA failure) or of the PCell in which the trigger for the re-establishment occurred (other cases); and 3> with all input bits for COUNT, BEARER and DIRECTION set to binary ones;

1> set the reestablishmentCause as follows:

2> if the re-establishment procedure was initiated due to reconfiguration failure as specified in 5.3.5.5 (the UE is unable to comply with the reconfiguration):

3> set the reestablishmentCause to the value reconfigurationFailure;

2> else if the re-establishment procedure was initiated due to handover failure as specified in 5.3.5.6 (intra-LTE handover failure) or 5.4.3.5 (inter-RAT mobility from EUTRA failure):

3> set the reestablishmentCause to the value handoverFailure;

2> else:

3> set the reestablishmentCause to the value otherFailure;

The UE shall submit the RRCConnectionReestablishmentRequest message to lower layers for transmission.

Meanwhile, as one of Internet of Things (IoT) technologies, a narrowband IoT (NB-IoT) technology is emerging. NB-IoT is a low-power wide-area (LPWA) IoT technology using an LTE frequency, which is frequently used for tracking, sensing, and metering that involves the intermittent transmission of low-capacity data. A UE supporting the NB-IoT technology needs to be used for a long time without battery replacement and thus is required to operate with extremely low power.

A UE used in NB-IoT is required to operate with low power and thus supports only minimum functions for communication with a base station. For example, an NB-IoT UE does not support a handover function in an RRC connected state. Therefore, when the UE connected to a specific cell moves to another cell, the UE may have a radio link failure (RLF) and it may take much time for the UE to recover to the RRC connected state.

Hereinafter, a method for performing an RRC connection re-establishment procedure according to the present invention will be described. According to the present invention, a UE not supporting a handover may actively perform a procedure for re-establishing an RRC connection to a new cell under a certain condition, thereby preventing a radio link failure in advance and maintaining excellent radio connection between cells.

Figure 5:
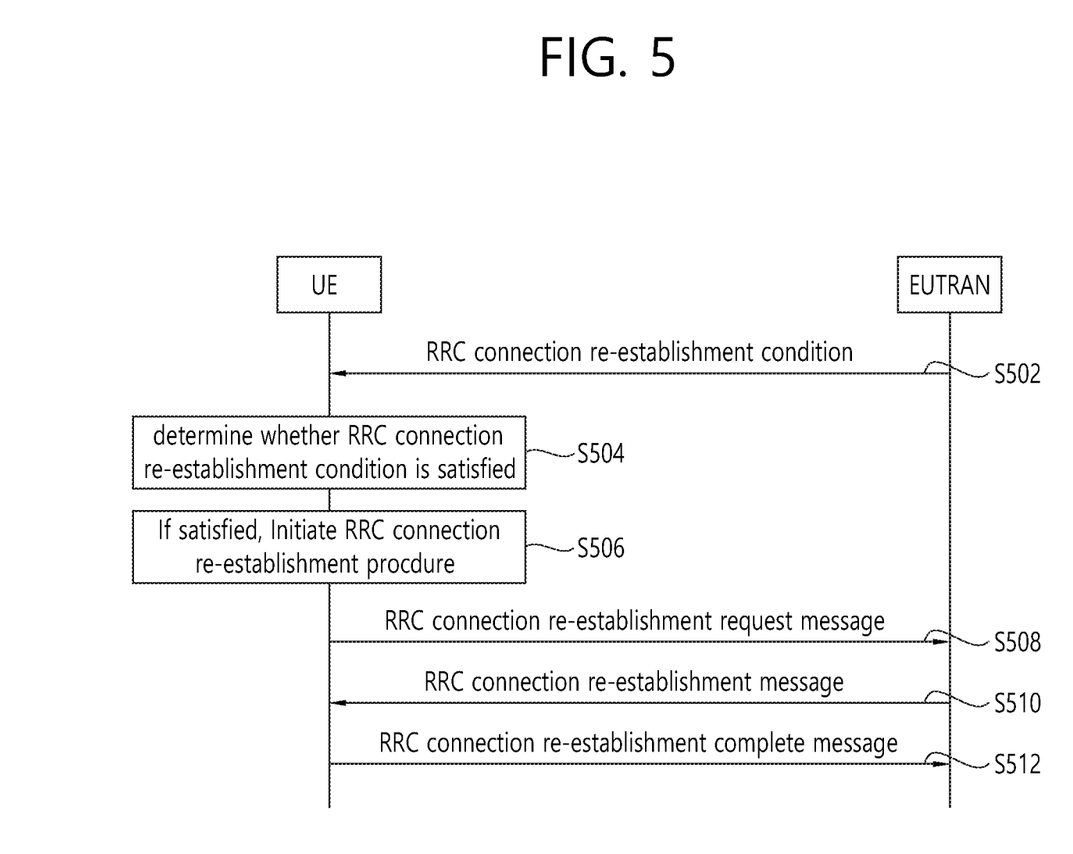
FIG. 5 illustrates an RRC connection re-establishment procedure according to one embodiment of the present invention.

FIG. 5 illustrates an RRC connection re-establishment procedure according to one embodiment of the present invention. In the present embodiment, a UE may perform an RRC connection re-establishment procedure regardless of whether AS security is activated when the UE satisfies a mobility condition, that is, an RRC connection re-establishment condition. In the present embodiment, it is assumed that the UE is a UE used for NB-IoT or CIoT and maintains an RRC connected state (or an RRC idle state) with respect to the first serving cell. According to the related art, the UE initiates an RRC connection re-establishment procedure, on the assumption that AS security is activated, when a radio link failure is detected; when a handover fails; when the UE moves due to an E-UTRA failure; when the failure of an integrity check is indicated from a lower layer; or when RRC connection reconfiguration fails.

First, the UE may receive an RRC connection re-establishment condition from a network (S502). According to one embodiment, the RRC connection re-establishment condition may be a condition that a measurement result with respect to the serving cell (or Pcell) is lower than a preset threshold or a condition that there is a measurement result with respect to a neighboring cell which is superior to the measurement result with respect to the serving cell. Here, the measurement result with respect to the serving cell or the neighboring cell may be at least one of reference signal received power (RSRP), reference signal received quality (RSRQ), and received signal strength indicator (RSSI).

Next, the UE may determine whether the received RRC connection re-establishment condition is satisfied (S504). To this end, the UE may perform measurements on the serving cell and the neighboring cell, and may determine whether the RRC connection re-establishment condition is satisfied based on measurement results.

When the RRC connection re-establishment condition is satisfied, the UE may initiate the RRC connection re-establishment procedure (S506).

According to one embodiment, when the measurement result with respect to the serving cell is lower than the preset threshold, the UE may initiate the RRC connection re-establishment procedure. In this case, the UE may perform the RRC connection re-establishment procedure by reselecting any one of neighboring cells.

According to one exemplary embodiment, when there is a measurement result with respect to a neighboring cell which is superior to the measurement result with respect to the serving cell, the UE may initiate the RRC connection re-establishment procedure. In this case, the UE may reselect the neighboring cell that satisfies the RRC connection re-establishment condition and may perform the RRC connection re-establishment procedure with respect to the reselected neighbor cell. Here, when there is a plurality of neighboring cells that satisfy the RRC connection re-establishment condition, the UE may reselect a neighboring cell having the best measurement result among the plurality of neighboring cells.

That is, when the RRC connection re-establishment procedure is initiated, the UE may reselect a cell through a general cell reselection procedure. However, when there is a neighboring cell satisfying a mobility condition, that is, the RRC connection re-establishment condition, the UE may select the neighboring cell as a serving cell.

The UE may transmit an RRC connection re-establishment request message (S508).

According to one exemplary embodiment, the RRC connection re-establishment request message may include a UE identity (resume ID), and the UE may set the UE identity by setting a c-RNTI as a resume identity used in the Pcell or a Pcell in which the RRC connection re-establishment procedure is triggered. That is, the RRC connection re-establishment request message may include resume ID assigned by the Pcell, instead of the c-RNTI.

Further, according to one embodiment, the RRC connection re-establishment request message may include a re-establishment cause (reestablishmentCause). When the RRC connection re-establishment is initiated by satisfying the above-mentioned mobility condition, the re-establishment cause may be set to a value indicating mobility. That is, the UE may set the re-establishment cause in the RRC connection re-establishment request message to indicate 'mobility,' thereby allowing the network to recognize that the RRC connection re-establishment procedure is aimed for mobility. Preferably, after receiving the RRC connection re-establishment request message, the network may resume all suspended RBs (including DRBs).

Meanwhile, the network may or may not allow the RRC connection re-establishment procedure of the UE. That is, the UE may perform the RRC connection re-establishment procedure with the permission of the network. Specifically, when the network transmits a permission indication to the UE, the UE may perform the RRC connection re-establishment procedure for the purpose of mobility, that is, to change the serving cell. When the network transmits a prohibition indication to the UE, the UE may not perform the RRC connection re-establishment procedure even though one of the above-mentioned RRC connection re-establishment conditions is satisfied.

The UE may receive an RRC connection re-establishment message from the network (S510). Upon receiving the RRC connection re-establishment message, the UE may immediately resume all radio bearers including DRBs.

Subsequently, the UE may transmit an RRC connection re-establishment completion message to the network (S512).

Figure 6:
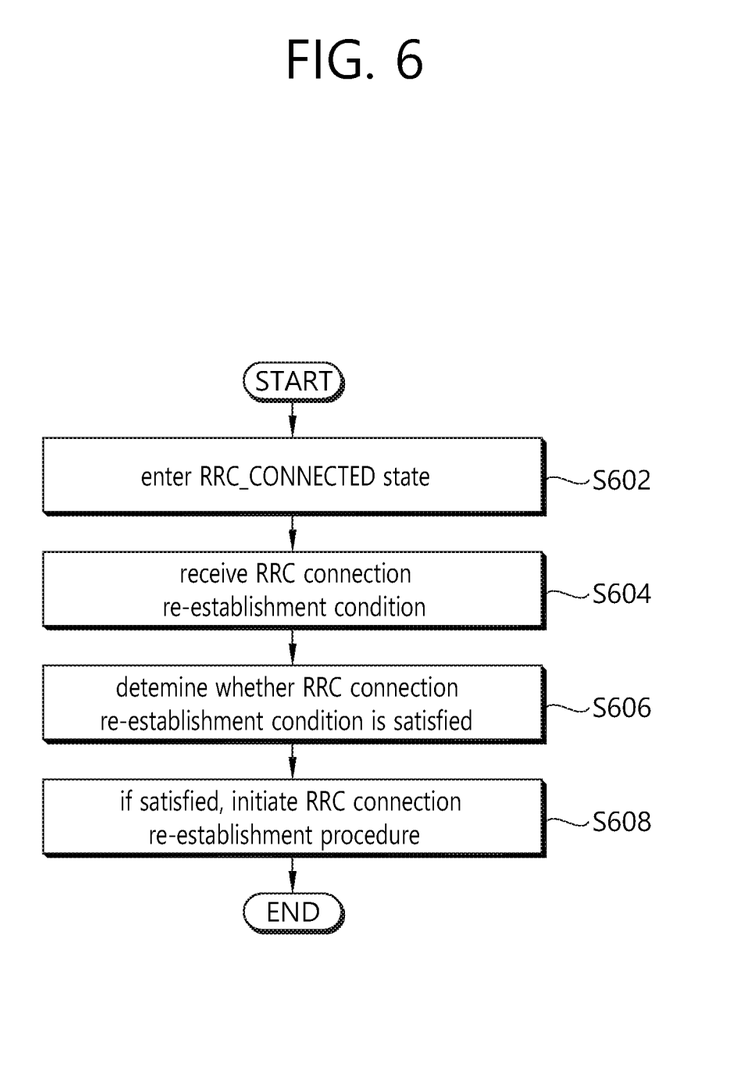
FIG. 6 illustrates an RRC connection re-establishment procedure according to one embodiment of the present invention

FIG. 6 illustrates an RRC connection re-establishment procedure according to one embodiment of the present invention. In the present embodiment, a UE may be a UE used for NB-IoT or CIoT. That is, the UE may be a UE not supporting a handover in an RRC connected state.

The UE may enter the RRC connected state (S602). Here, there is no particular restriction on a process in which the UE enters the RRC connected state. That is, the UE may maintain the RRC connected state with respect to the first serving cell (or Pcell).

The UE may receive an RRC connection re-establishment condition (S604). According to one embodiment, the RRC connection re-establishment condition may indicate one or more of a condition that a measurement result with respect to the serving cell is lower than a preset threshold and a condition that there is a measurement result with respect to a neighboring cell which is superior to the measurement result with respect to the serving cell. The measurement result may be at least one of reference signal received power (RSRP), reference signal received quality (RSRQ), and received signal strength indicator (RSSI).

The UE may determine whether the RRC connection re-establishment condition is satisfied based on the measurement result (S606). For example, when the measurement result with respect to the serving cell is lower than the preset threshold, the UE may determine that the RRC connection re-establishment condition is satisfied. Further, when there is a measurement result with respect to a neighboring cell which is superior to the measurement result with respect to the serving cell, the UE may determine that the RRC connection re-establishment condition is satisfied.

When the RRC connection re-establishment condition is satisfied, the UE may initiate the RRC connection re-establishment procedure (S608). Specifically, the UE may reselect the neighboring cell that satisfies the RRC connection re-establishment condition and may perform the RRC connection re-establishment procedure with respect to the reselected cell. According to one embodiment, when there is a plurality of neighboring cells that satisfy the RRC connection re-establishment condition, the UE may reselect a neighboring cell having the best measurement result among the plurality of neighboring cells.

Further, according to one embodiment, the UE may receive a permission indication with respect to the RRC connection re-establishment procedure from a network. The UE may perform the RRC connection re-establishment procedure under the condition that the UE receives the permission indication from the network. Further, the UE may transmit an RRC connection re-establishment request message to the network, and the RRC connection re-establishment request message may include a re-establishment cause indicating that the RRC connection re-establishment request message is aimed for the mobility of the UE. The RRC connection re-establishment request message may comprise resume identity (resume ID) of the UE assigned by the serving cell. Also, the UE may resume a radio bearer under the condition of receiving an RRC connection re-establishment message from the network in response to the RRC connection re-establishment request message.

Figure 7:
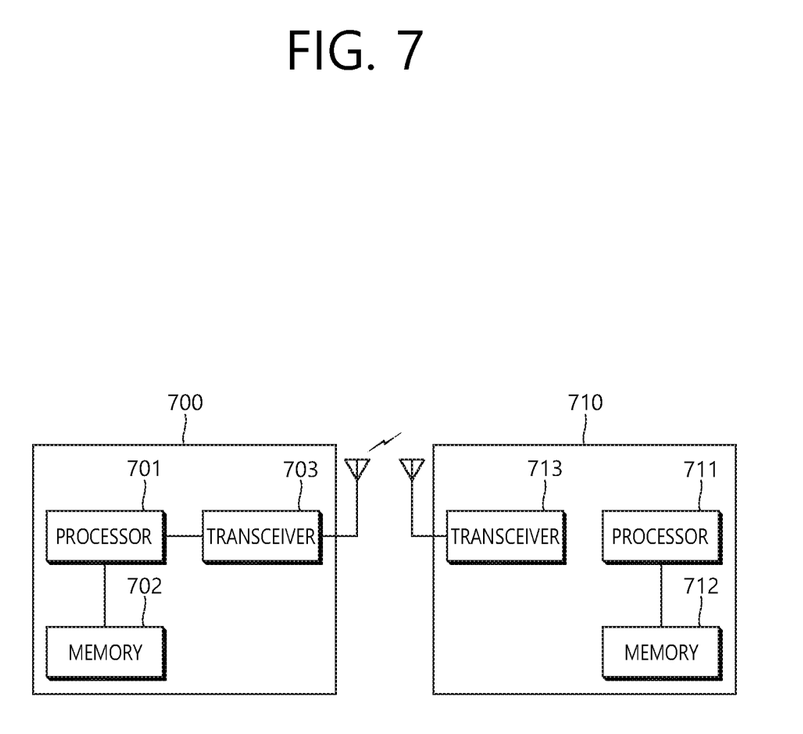
FIG. 7 shows a wireless communication system to implement an embodiment of the present invention.

FIG. 7 is a block diagram illustrating a wireless apparatus in which an embodiment of the present invention can be implemented.

A BS 700 includes a processor 701, a memory 702, and a transceiver 703. The memory 702 is coupled to the processor 701, and stores a variety of information for driving the processor 701. The transceiver 703 is coupled to the processor 701, and transmits and/or receives a radio signal. The processor 701 implements the proposed functions, procedures, and/or methods. In the aforementioned embodiments, an operation of the BS may be implemented by the processor 701.

A UE 710 includes a processor 711, a memory 712, and a transceiver 713. The memory 712 is coupled to the processor 711, and stores a variety of information for driving the processor 711. The transceiver 713 is coupled to the processor 711, and transmits and/or receives a radio signal. The processor 61 implements the proposed functions, procedures, and/or methods. In the aforementioned embodiments, an operation of the UE 710 may be implemented by the processor 711.

The processors 711 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a narrow bandwidth Internet of Things (NB-IoT) user equipment (UE) in a wireless communication system, the method comprising:
   receiving, from a serving cell, information informing a neighbor cell for which a radio resource control (RRC) connection re-establishment is performed, and a mobility condition that a cell quality of the neighbor cell is better than a cell quality of the serving cell;
   performing a measurement on the cell quality of the neighbor cell and the cell quality of the serving cell;
   upon identifying that the mobility condition is satisfied based on the measurement, transmitting, to the neighbor cell, an RRC connection re-establishment request message for requesting the RRC connection re-establishment,
   wherein the RRC connection re-establishment request message includes a re-establishment cause informing that the RRC connection re-establishment is caused by a mobility of the NB-IoT UE,
   wherein the RRC connection re-establishment request message includes a resume identity (ID) assigned by the serving cell, and
   wherein the RRC connection re-establishment is related to resuming one or more radio bearers (RBs) for the NB-IoT UE.

2. A narrow bandwidth Internet of Things (NB-IoT) user equipment (UE) in a wireless communication system, the NB-IoT UE comprising:
   a memory;
   a transceiver; and
   at least one processor operatively coupled to the memory and the transceiver,
   wherein the at least one processor is configured to:
   control the transceiver to receive, from a serving cell, information informing a neighbor cell for which a radio resource control (RRC) connection re-establishment is performed, and a mobility condition that a cell quality of the neighbor cell is better than a cell quality of the serving cell,
   perform a measurement on the cell quality of the neighbor cell and the cell quality of the serving cell, and
   upon identifying that the mobility condition is satisfied based on the measurement, control the transceiver to transmit, to the neighbor cell, an RRC connection re-establishment request message for requesting the RRC connection re-establishment,
   wherein the RRC connection re-establishment request message includes a re-establishment cause informing that the RRC connection re-establishment is caused by a mobility of the NB-IoT UE,
   wherein the RRC connection re-establishment request message includes a resume identity (ID) assigned by the serving cell, and
   wherein the RRC connection re-establishment is related to resuming one or more radio bearers (RBs) for the NB-IoT UE.

* * * * *